United States Patent [19]
Roberts

[11] Patent Number: 5,426,883
[45] Date of Patent: Jun. 27, 1995

[54] FLOATING CASTING APPARATUS

[76] Inventor: Duane A. Roberts, 1115 N. Rollingbrook Ct., Kings Mountain, N.C. 28086

[21] Appl. No.: 221,951

[22] Filed: Mar. 11, 1994

[51] Int. Cl.$^6$ .................. A01K 91/00; A01K 97/00
[52] U.S. Cl. ..................... 43/43.1; 43/42.31; 446/160
[58] Field of Search ............... 43/43.1, 44.87, 44.91, 43/44.92, 42.31; 446/153, 155, 160, 163; D22/145, 146

[56] References Cited

U.S. PATENT DOCUMENTS

| | | | |
|---|---|---|---|
| 1,804,084 | 5/1931 | Blake | 43/43.1 |
| 2,999,329 | 9/1961 | Pankuch | 43/42.31 |
| 3,237,338 | 3/1966 | Lucas | 43/44.92 |
| 3,996,692 | 12/1976 | Daenen | 446/160 |
| 4,045,907 | 9/1977 | Mumford | 446/160 |
| 4,435,914 | 3/1984 | Norman | 43/42.31 |
| 4,477,996 | 10/1984 | Walter | . |
| 4,540,376 | 9/1985 | Turbowitz | 446/164 |
| 4,673,370 | 6/1987 | Goldfarb | 446/160 |
| 4,696,125 | 9/1987 | Rayburn | . |
| 4,817,326 | 4/1989 | Benjestorf | . |
| 4,845,880 | 7/1989 | Miller | . |
| 4,866,874 | 9/1989 | Dudley | . |

Primary Examiner—Kurt Rowan

[57] ABSTRACT

A new and improved floating casting apparatus is provided for floating on a water surface and includes a floating toy assembly which includes a top portion and a bottom portion. The top portion has greater buoyancy than the bottom portion. A line connector assembly is connected to the floating toy assembly for connecting to a fishing line which is reeled in at a fishing rod such that, when the floating toy assembly is reeled in by the fishing line, the top portion of the floating toy assembly is oriented above the bottom portion of the floating toy assembly. The floating toy assembly resembles a miniature automotive vehicle which includes a plurality of simulated front and rear wheels. The simulated rear wheels include paddle members attached radially to the simulated rear wheels such that, when the floating toy assembly is reeled in by the fishing line and fishing rod, the paddle members smack the water surface causing a water spray to be produced from a rear portion of the floating toy assembly. A pair of pontoon assemblies is connected to the bottom portion of the floating toy assembly. The pontoon assemblies have an overall buoyancy less than the top portion of the floating toy assembly.

7 Claims, 2 Drawing Sheets

FLOATING CASTING APPARATUS

BACKGROUND OF THE INVENTION

1. Field of the Invention

The present invention relates generally to casting devices used for casting fishing line and, more particularly, to a casting devices that floats.

2. Description of the Prior Art

In the sport of fishing there are a number of fishing techniques that may be employed. One well known technique involves the use of a fishing rod, fishing line, and a weighted casting device attached to one end of the line. Well developed casting skills enable a fisherman place a fish hook at a chosen location which may be most beneficial to catching a fish. With well developed casting skills, the fisherman is often able to avoid tree limbs, rocks, and the lines of other fishermen.

Because well developed casting skills are so important, fishermen will often practice casting to improve their casting skills. Both children and adults participate in the sport of fishing, and both children and adults benefit from well developed casting skills. To prevent the practice of casting from being unpleasant or boring, it would be desirable if a casting practice device provided interesting visual effects during the practice of casting.

Casting practice may seem like hard work to some individuals, especially children. In these circumstances, the individuals may seek to avoid practicing casting. As a result, their casting skills may remain underdeveloped. To avoid such unpleasant associations with casting practice, it would be desirable if casting practice were more like play than work. By casting practice being a form of play, casting practice will be associated with pleasant experiences and may not be readily avoided. On the contrary, when casting practice is associated with play, casting practice may be eagerly sought.

Play can take many forms. However, one common method of play involves the use of toys. Toys can take many forms, and one common form of toy is a miniature of a real-life object. One very popular form of toy is a miniature automotive vehicle, such as a passenger automobile or truck. In this respect, it would be desirable if a device for practicing casting were provided which included a toy. More specifically, it would be desirable if a device for practicing casting included a miniature of an automotive vehicle.

Most toys, such as miniature automotive vehicles, have a proper vertical orientation. That is, there is a proper top side and a proper bottom side. When an object is cast by a fishing rod, it is extremely difficult, if not impossible, to control the casted device so that the casted device will land in the water and remain in the water with its proper top side up and its bottom side down. In this respect, it would be desirable if a device for practicing casting were provided which included components that assured that the top side is up and the bottom side is down when the device floats in the water.

In keeping with the idea that a casting device can be a miniature of a real-life automotive vehicle, it is realized that many automotive vehicles, especially race cars, are decorated with distinctive logos or decals. In this respect, it would be desirable if a device for practicing casting were provided which included a miniature automotive vehicle that included distinctive logos or decals.

When a floating casted item is reeled in, the casted item cuts through the surface of the water. In so doing, the casted item disturbs the water surface making waves. To create an exciting visual effect, however, it would be desirable if the casted item created other disturbances in the water besides making waves when the floating casted item is reeled in.

Throughout the years, a number of innovations have been developed relating to floating casted items, and the following U.S. patents are representative of some of those innovations: U.S. Pat. Nos. 4,477,996; 4,696,125; 4,817,326; and 4,866,874. In addition, U.S. Pat. No. 4,845,880 may be of interest for its disclosure of a device for a fishing rod that is used in casting.

Thus, while the foregoing body of prior art indicates it to be well known to use floating casted devices, the prior art described above does not teach or suggest a floating casting apparatus which has the following combination of desirable features: (1) provides interesting visual effects during the practice of casting; (2) makes casting practice are more like play than work; (3) includes a toy; (4) includes a miniature of an automotive vehicle; (5) includes components that assure that the top side of the casted device orients upward and that the bottom side of the casted device orients downward when the device floats in the water; (6) provides a miniature automotive vehicle that includes distinctive logos or decals; and (7) creates other disturbances in the water besides making waves when the floating casted item is reeled in. The foregoing desired characteristics are provided by the unique floating casting apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved floating casting apparatus which floats on a water surface. The floating casting apparatus includes a floating toy assembly which has a top portion and a bottom portion. The top portion has greater buoyancy than the bottom portion. A line connector assembly is connected to the floating toy assembly for connecting to a fishing line such that, when the floating toy assembly is reeled in by the fishing line, the top portion of the floating toy assembly is oriented above the bottom portion of the floating toy assembly.

The floating toy assembly resembles a miniature automotive vehicle. The top portion of the floating toy assembly resembles a top portion of a miniature automotive vehicle. The bottom portion of the floating toy assembly resembles a bottom portion of a miniature automotive vehicle. The bottom portion of the floating toy assembly includes a plurality of simulated front wheels and a plurality of simulated rear wheels. The simulated rear wheels includes a plurality of paddle members attached radially to the simulated rear wheels such that, when the floating toy assembly is reeled in by the fishing line, the paddle members smack the water surface causing a water spray to be produced from a rear portion of the floating toy assembly.

A pair of pontoon assemblies is connected to the bottom portion of the floating toy assembly. The pontoon assemblies have an overall buoyancy less than the top portion of the floating toy assembly. As a result, when the floating toy assembly is reeled in by the fishing line, the top portion of the floating toy assembly is automatically oriented above the bottom portion of the floating toy assembly.

The line connector assembly includes a straight portion which is connected to the bottom portion of the floating toy assembly. A curved portion is connected to the straight portion. The curved portion is adapted for connecting to an end of the fishing line. The fishing line can be tied to the curved portion of the line connector assembly.

A longitudinal axis extends from a front end of the floating toy assembly to a rear end of the floating toy assembly. A first of the pontoon assemblies is located on a first side of the longitudinal axis, and a second of the pontoon assemblies is located on a second side of the longitudinal axis.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved floating casting apparatus which has all of the advantages of the prior art and none of the disadvantages.

It is another object of the present invention to provide a new and improved floating casting apparatus which may be easily and efficiently manufactured and marketed.

It is a further object of the present invention to provide a new and improved floating casting apparatus which is of durable and reliable construction.

An even further object of the present invention is to provide a new and improved floating casting apparatus which is susceptible of a low cost of manufacture with regard to both materials and labor, and which accordingly is then susceptible of low prices of sale to the consuming public, thereby making such floating casting apparatus available to the buying public.

Still yet a further object of the present invention is to provide a new and improved floating casting apparatus which provides interesting visual effects during the practice of casting.

Still another object of the present invention is to provide a new and improved floating casting apparatus that makes casting practice are more like play than work.

Yet another object of the present invention is to provide a new and improved floating casting apparatus which includes a toy.

Even another object of the present invention is to provide a new and improved floating casting apparatus that includes a miniature of an automotive vehicle.

Still a further object of the present invention is to provide a new and improved floating casting apparatus which includes components that assure that the top side of the casted device orients upward and that the bottom side of the casted device orients downward when the device floats in the water.

Yet another object of the present invention is to provide a new and improved floating casting apparatus that provides a miniature automotive vehicle that includes distinctive logos or decals.

Still another object of the present invention is to provide a new and improved floating casting apparatus which creates other disturbances in the water besides making waves when the floating casted item is reeled in.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
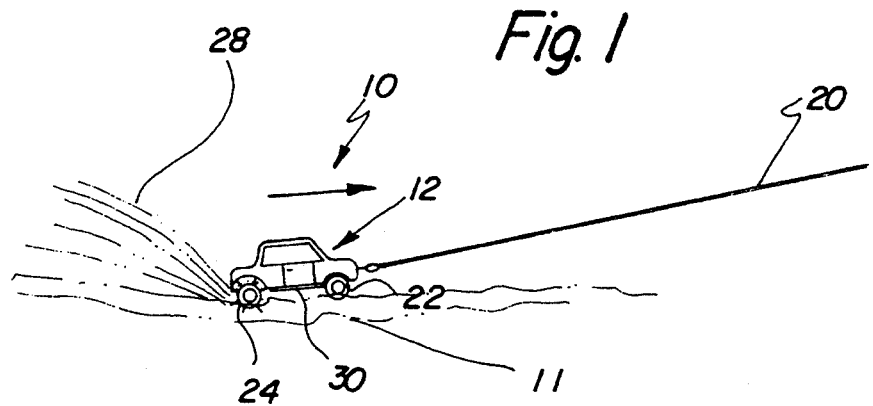
FIG. 1 is a view showing a preferred embodiment of the floating casting apparatus of the invention being reeled in on a surface of water.

With reference to the drawings, a new and improved floating casting apparatus embodying the principles and concepts of the present invention will be described.

Turning to FIGS. 1-4, there is shown an exemplary embodiment of the floating casting apparatus of the invention generally designated by reference numeral 10. In its preferred form, a floating casting apparatus 10 is provided for floating on a water surface 11 and includes a floating toy assembly 12 which includes a top portion 14 and a bottom portion 16. The top portion 14 has greater buoyancy than the bottom portion 16. A line connector assembly 18 is connected to the floating toy assembly 12 for connecting to a fishing line 20 such that, when the floating toy assembly 12 is reeled in by the fishing line 20, the top portion 14 of the floating toy assembly 12 is oriented above the bottom portion 16 of the floating toy assembly 12.

The floating toy assembly 12 resembles a miniature automotive vehicle. The top portion 14 of the floating toy assembly 12 resembles a top portion of a miniature automotive vehicle. The bottom portion 16 of the floating toy assembly 12 resembles a bottom portion of a miniature automotive vehicle. The bottom portion 16 of the floating toy assembly 12 includes a plurality of simulated front wheels 22 and a plurality of simulated rear wheels 24. The simulated rear wheels 24 include a plurality of paddle members 26 attached radially to the simulated rear wheels 24 such that, when the floating toy assembly 12 is reeled in by the fishing line 20, the paddle members 26 smack the water surface 11 causing a water spray 28 to be produced from a rear portion of the floating toy assembly 12.

It will be noted that the paddle wheels or members 26 are mounted outboard with respect to the bottom portion 16 and that the rear end of the bottom portion 16 adjacent the paddle members is truncated along surface 17 substantially as shown to provide a tapered or nozzle configuration which together with the preferred outboard mounting arrangement of the paddle members facilitates a smooth, non-restricted flow of water underneath portion 16.

A pair of pontoon assemblies 30 is connected to the bottom portion 16 of the floating toy assembly 12. The pontoon assemblies 30 have an overall buoyancy less than the top portion 14 of the floating toy assembly 12. As a result, when the floating toy assembly 12 is reeled in by the fishing line 20, the top portion 14 of the floating toy assembly 12 is automatically oriented above the bottom portion 16 of the floating toy assembly 12.

Figure 3:
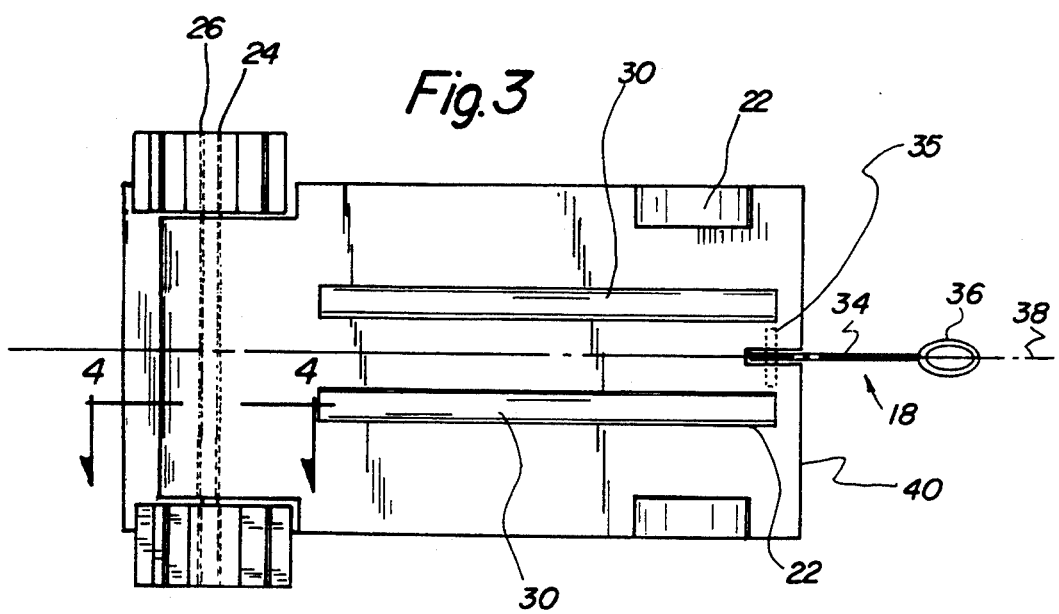
FIG. 3 is a bottom view of the embodiment of the invention shown in FIG. 2 taken along line 3—3 of FIG. 2.

The line connector assembly 18 includes a straight portion 34 which is connected to the bottom portion 16 of the floating toy assembly 12. A curved portion 36 is connected to the straight portion 34. The curved portion 36 is adapted for connecting to an end of the fishing line 20. The fishing line 20 can be tied to the curved portion 36 of the line connector assembly 18. As shown in FIG. 3, the straight portion 34 of the line connector assembly 18 is connected to the bottom portion 16 of the floating toy assembly 12 by a pivot pin 35.

A longitudinal axis 38 extends from a front end 40 of the floating toy assembly 12 to a rear end 42 of the floating toy assembly 12. A first of the pontoon assemblies 30 is located on a first side of the longitudinal axis 38, and a second of the pontoon assemblies 30 is located on a second side of the longitudinal axis 38.

In use, the floating casting apparatus 10 of the invention is connected to a fishing line 20 by tying the end of the fishing line 20 to the curved portion 36 of the line connector assembly 18. The curved portion 36 is in the form of a oval loop. Before casting, the floating casting apparatus 10 of the invention is reeled in to a fishing rod with a reel (not shown). Then, the floating casting apparatus 10 is casted in a conventional way into a body of water. After the floating casting apparatus 10 hits the water, it is reeled in at the fishing rod and reel, and it automatically orients itself so that its top portion 14 is oriented over its bottom portion 16. As the floating casting apparatus 10 is reeled in, the paddle members 26 of the simulated rear wheels 24 create a water spray 28 emanating from the rear end 42 of the floating toy assembly 12.

Figure 2:
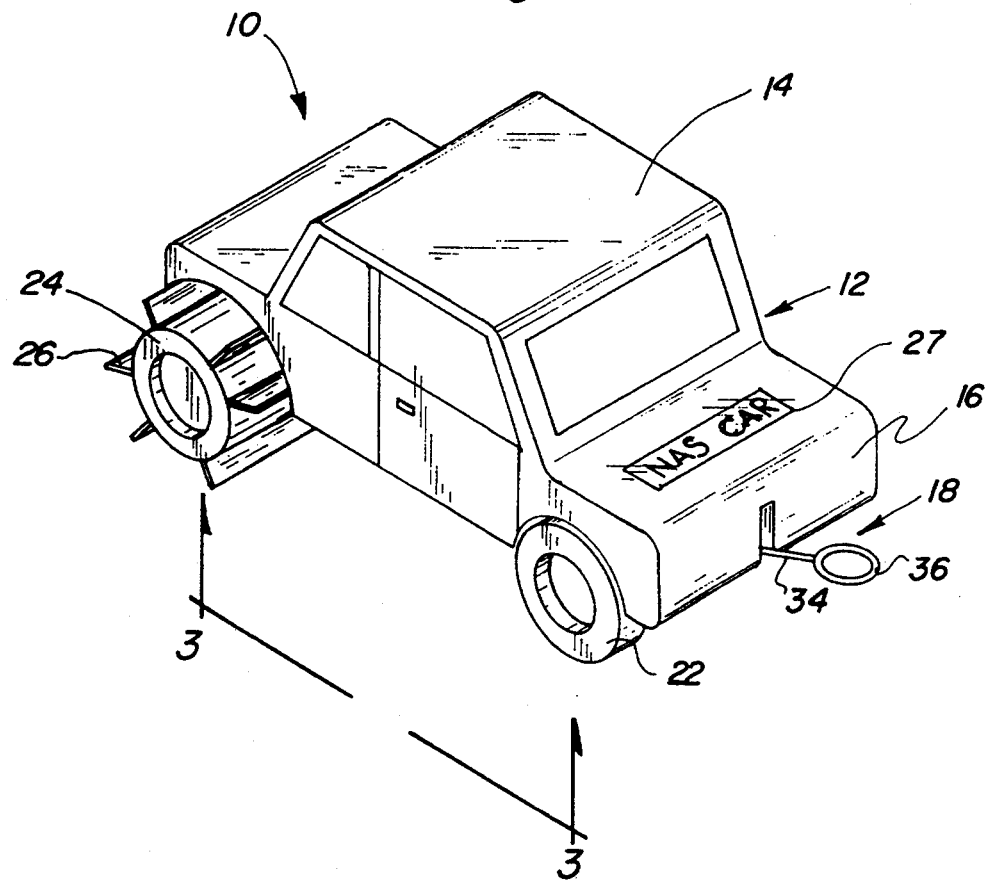
FIG. 2 is an enlarged top perspective view of the embodiment of the invention shown in FIG. 1.
Figure 4:
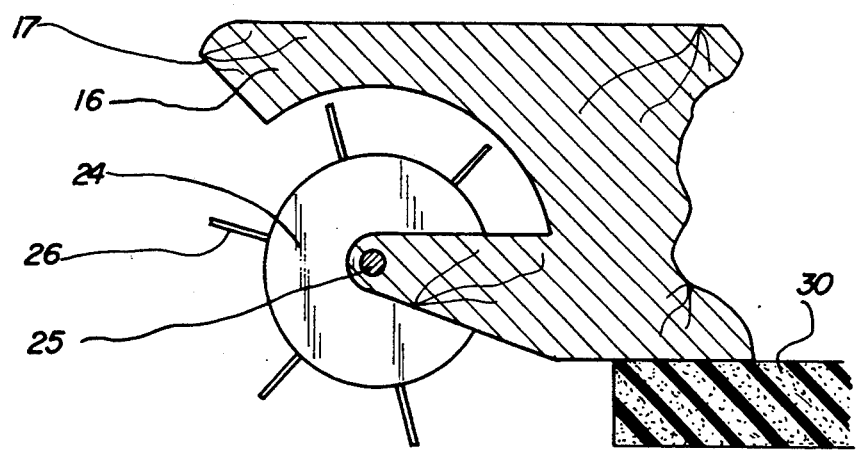
FIG. 4 is a partial cross-sectional view of the embodiment of the invention shown in FIG. 3 taken along line 4—4 in FIG. 3.

As shown in FIG. 2, a decal 27 is placed on the top portion 14 of the floating toy assembly 12. As shown in FIG. 4, the simulated rear wheels 24 are connected to the floating toy assembly 12 by axles 25.

The components of the floating casting apparatus of the invention can be made from inexpensive and durable wood and plastic materials. Balsa wood is particularly useful because of its relatively low density and high buoyancy.

Although the toy of the invention has been disclosed as a miniature motor vehicle, other forms of the toy are contemplated. For example, the toy can be a toy boat, a toy airplane such as a seaplane, or a toy human water skier, among others.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved floating casting apparatus that is low in cost, relatively simple in design and operation, and which may advantageously be used to provide interesting visual effects during the practice of casting. With the invention, a floating casting apparatus is provided which makes casting practice are more like play than work. With the invention, a floating casting apparatus is provided which includes a toy. With the invention, a floating casting apparatus is provided which includes a miniature of an automotive vehicle. With the invention, a floating casting apparatus is provided which includes components that assure that the top side of the casted device orients upward and that the bottom side of the casted device orients downward when the device floats in the water. With the invention, a floating casting apparatus is provided which provides a miniature automotive vehicle that includes distinctive logos or decals. With the invention, a floating casting apparatus is provided which creates other disturbances in the water besides making waves when the floating casted item is reeled in.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved floating casting apparatus for floating on a water surface, comprising:

a floating toy assembly which includes a top portion and a bottom portion, said top portion having greater buoyancy than said bottom portion, wherein said floating toy assembly resembles a miniature automotive vehicle, wherein said bottom portion of said floating toy assembly includes a plurality of simulated front wheels and a plurality of simulated rear wheels, and a line connector assembly, connected to said floating toy assembly, for connecting to a fishing line, such that, when said floating toy assembly is being reeled in by the fishing line, said top portion of said floating toy assembly is oriented above said bottom portion of said floating toy assembly, wherein said simulated rear wheels include a plurality of paddle members attached radially to said simulated rear wheels, such that, when said floating toy assembly is reeled in by the fishing line, said paddle members smack the water surface causing a water spray to be produced from a rear portion of said floating toy assembly.

2. The apparatus described in claim 1 further including:

a pair of pontoon assemblies connected to said bottom portion of said floating toy assembly, said pontoon assemblies having an overall buoyancy less than said top portion of said floating toy assembly, such that, when said floating toy assembly is being reeled in by the fishing line, said top portion of said floating toy assembly is oriented above said bottom portion of said floating toy assembly.

3. The apparatus described in claim 1 wherein said line connector assembly includes:

a straight portion connected to said bottom portion of said floating toy assembly, and a curved portion connected to said straight portion, said curved portion being adapted for connecting to a tied end of the fishing line.

4. The apparatus described in claim 1 wherein a longitudinal axis extends from a front end of said floating toy assembly to a rear end of said floating toy assembly.

5. The apparatus described in claim 4 wherein a first of a pair of pontoon assemblies is located on a first side of said longitudinal axis, and wherein a second of a pair of pontoon assemblies is located on a second side of said longitudinal axis.

6. The apparatus described in claim 1 wherein said top portion of said floating toy assembly resembles a top portion of a miniature automotive vehicle.

7. The apparatus described in claim 1 wherein said bottom portion of said floating toy assembly resembles a bottom portion of a miniature automotive vehicle.

* * * * *